United States Patent
Shank et al.

[11] Patent Number: 6,003,552
[45] Date of Patent: Dec. 21, 1999

[54] ROCKER VALVE FOR SEALING LARGE ORIFICES

[75] Inventors: John R. Shank; Peter A. Holborow, both of Califon; William G. Reeson, Jr., Denville, all of N.J.

[73] Assignee: Automatic Switch Company, Florham Park, N.J.

[21] Appl. No.: 09/114,958

[22] Filed: Jul. 13, 1998

[51] Int. Cl.$^6$ .................................................. F16K 11/02
[52] U.S. Cl. .................. 137/625.44; 137/870; 137/871; 251/129.15
[58] Field of Search ................... 137/870, 871, 137/625.44; 251/129.15

[56] References Cited

U.S. PATENT DOCUMENTS

| | | | |
|---|---|---|---|
| 2,570,450 | 10/1951 | Hottenroth | 137/870 X |
| 2,935,086 | 5/1960 | Lehman et al. | 251/38 X |
| 3,683,962 | 8/1972 | Good | 251/138 X |
| 3,991,788 | 11/1976 | Kull | 137/870 X |
| 4,250,924 | 2/1981 | Sakakibara | 137/870 X |
| 5,027,857 | 7/1991 | Champseix | 137/625.44 |
| 5,199,462 | 4/1993 | Baker | 137/625.44 |
| 5,337,785 | 8/1994 | Romer | 251/129.17 X |
| 5,653,422 | 8/1997 | Pieloth et al. | 251/129.17 |

*Primary Examiner*—Stephen M. Hepperle
*Assistant Examiner*—John Bastianelli
*Attorney, Agent, or Firm*—Levine & Mandelbaum

[57] ABSTRACT

A rocker valve for alternately sealing one of two outlet ports is provided with two cylinders in which there are respectively disposed pistons carrying sealing members for longitudinal reciprocation along the extended axes of valve seats respectively surrounding the port openings. The rocker is rotated to urge one piston toward its respective valve seat while permitting the other piston to be retracted from its respective valve seat. An elastomeric diaphragm is mounted between the sealing members mounted on the pistons and the valve seats whereby the sealing members urge the diaphragm against the valve seats during sealing. The longitudinal motion of the pistons prevents skewing of the sealing members during rotation of the rocker arm for maintaining the sealing members parallel to the valve seats throughout the strokes of the pistons.

3 Claims, 2 Drawing Sheets

ROCKER VALVE FOR SEALING LARGE ORIFICES

BACKGROUND OF THE INVENTION

This invention relates to a valve having a rocker and an isolation diaphragm for alternately sealing one or the other of two fluid inlet or outlet ports. More specifically, this invention deals with a rocker valve suitable for selectively sealing ports of relatively large diameter.

It is known in the art to employ a rocker in a three-way valve having a single fluid inlet port and two outlet ports. In such valves, the rocker pivots between two extreme positions at which a valve sealing member mounted on the end of a pressure arm of the rocker closes one or the other of the outlet ports, the inlet port being constantly open.

Because of the arcuate motion of the valve rocker as it rotates about its pivot axis, the angle between the plane of the sealing surface of each valve sealing member on one of the rocker pressure arms relative to the plane of the valve seat surrounding the outlet port which is to be sealed varies as each respective valve sealing member approaches its corresponding valve seat. In order to minimize the problem of uneven seating caused by having a rotating rocker engage against a planar valve seat, the diameter of the arc of travel of the rocker must be relatively large in comparison with the diameters of the valve seat openings. Where larger port openings are required, the rocker must be of correspondingly greater size. As the size of the rocker increases, the force necessary to move it also increases due to be enlarged area of the rocker which is exposed to fluid pressure.

Moreover, even in valves with relatively large rockers, after initial engagement of a valve sealing member against its respective valve seat, the resilient nature of the interface between the valve sealing member and valve seat allows for movement of the valve sealing member against the valve seat causing relative skewing between the sealing member and valve seat until the rocker reaches a terminal position. The terminal position of the rocker with respect to the valve seat can vary depending on dimensional tolerances, resiliency of elastomeric sealing elements, and normal wear in use.

A valve of the aforesaid type is disclosed in U.S. Pat. No. 5,199,462 to Baker for a Valve Having Rocker Valve Sealing Member and Isolation Diaphragm. Although the invention of this patent admirably overcomes certain leakage problems associated with prior art valves, the angular movement of the sealing members on this valve and the other prior art valves upon which it improves causes the valve to suffer from the shortcomings discussed above when used to seal valve seats on ports of relatively large diameter.

SUMMARY OF THE INVENTION

The present invention overcomes the shortcomings of prior art rocker valves when used to seal relatively large orifices by employing valve sealing members mounted on respective pistons mounted in cylinders for linear reciprocal movement in response to the angular movement of a rocker in a rocker valve. Each piston is able to vary its angle with respect to the rocker as the rocker urges the piston toward its respective outlet port valve seat so that the sealing surface of the valve sealing member is parallel to the valve seat irrespective of the angular position of the rocker.

By employing linearly reciprocating pistons to open and close the valve ports, the need for a large rocker is eliminated. Pistons are inherently more efficient than a rocker in that virtually their entire cross sectional area is used for sealing a valve port. Much of the area of a rocker exposed to fluid pressure does not engage a valve seat. Hence the fluid force against the pistons which opposes switching of the rocker valve is substantially less than when the fluid pressure is directly applied to a valve rocker having no cooperating pistons.

It is therefore an object of the invention to provide a three-way rocker valve in which a rocker can be rotated to alternately seal one of two valve ports having a respective valve seat of large diameter relative to the span of the pressure arms of the rocker.

Another object of the invention is to provide a three-way rocker valve with a rocker having oppositely distending pressure arms each of which is engageable with a respective longitudinally reciprocable piston on which a sealing member is mounted.

Still another object of the invention is to provide a rocker valve with a diaphragm intermediate the respective seats on two valve ports and sealing members mounted on pistons respectively engageable with the extremities of the pressure arms of a valve rocker.

Other and further objects of the invention will be apparent from the following drawings and description of a preferred embodiment of the invention in which like reference numerals are used to indicate like parts in the various views.

DESCRIPTION OF THE PREFERRED EMBODIMENT

Figure 1:
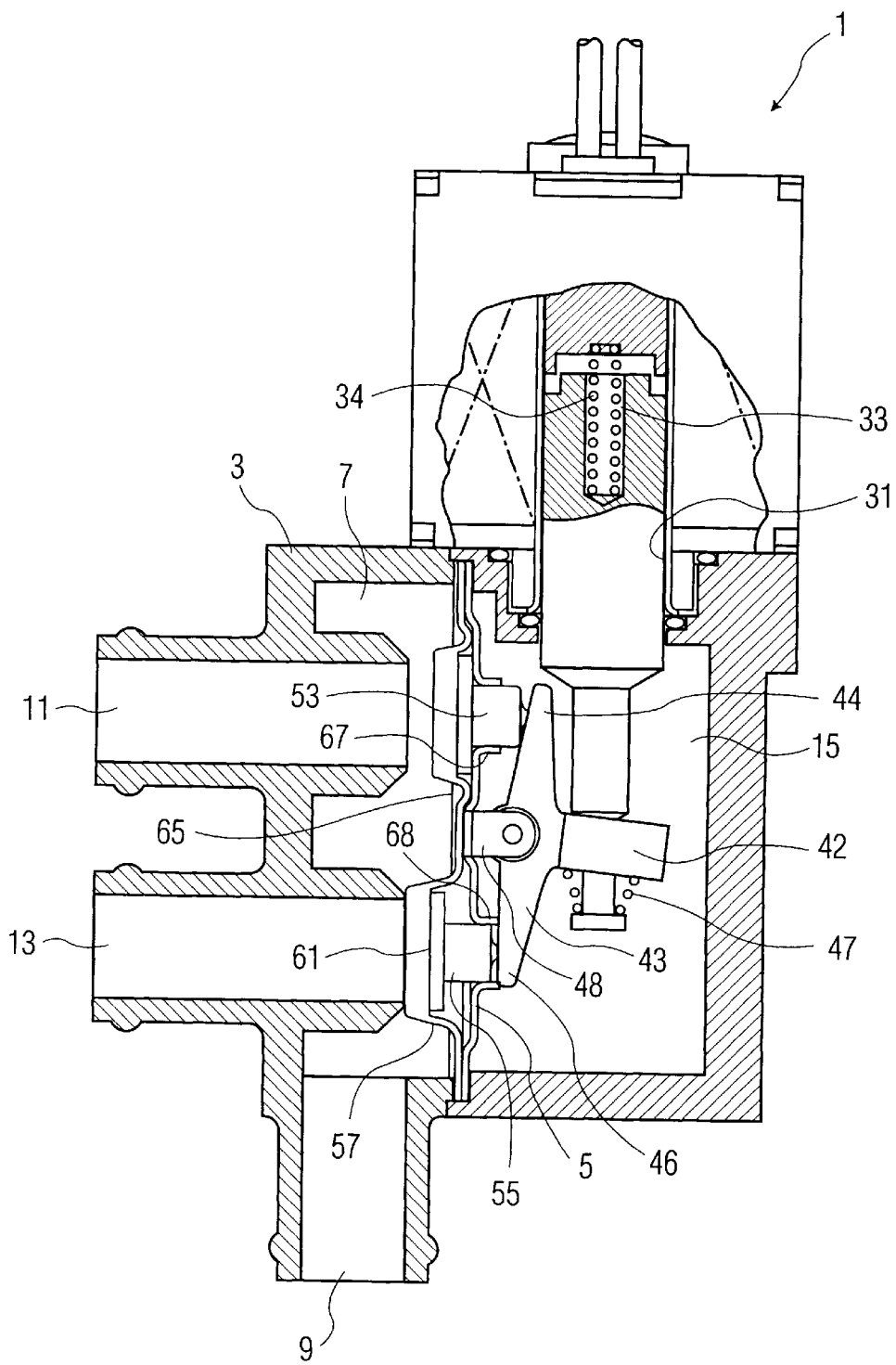
FIG. 1 is an elevation view of a rocker valve in accordance with the preferred embodiment of the invention, with certain parts shown in section, the rocker valve being in a first state.
Figure 2:
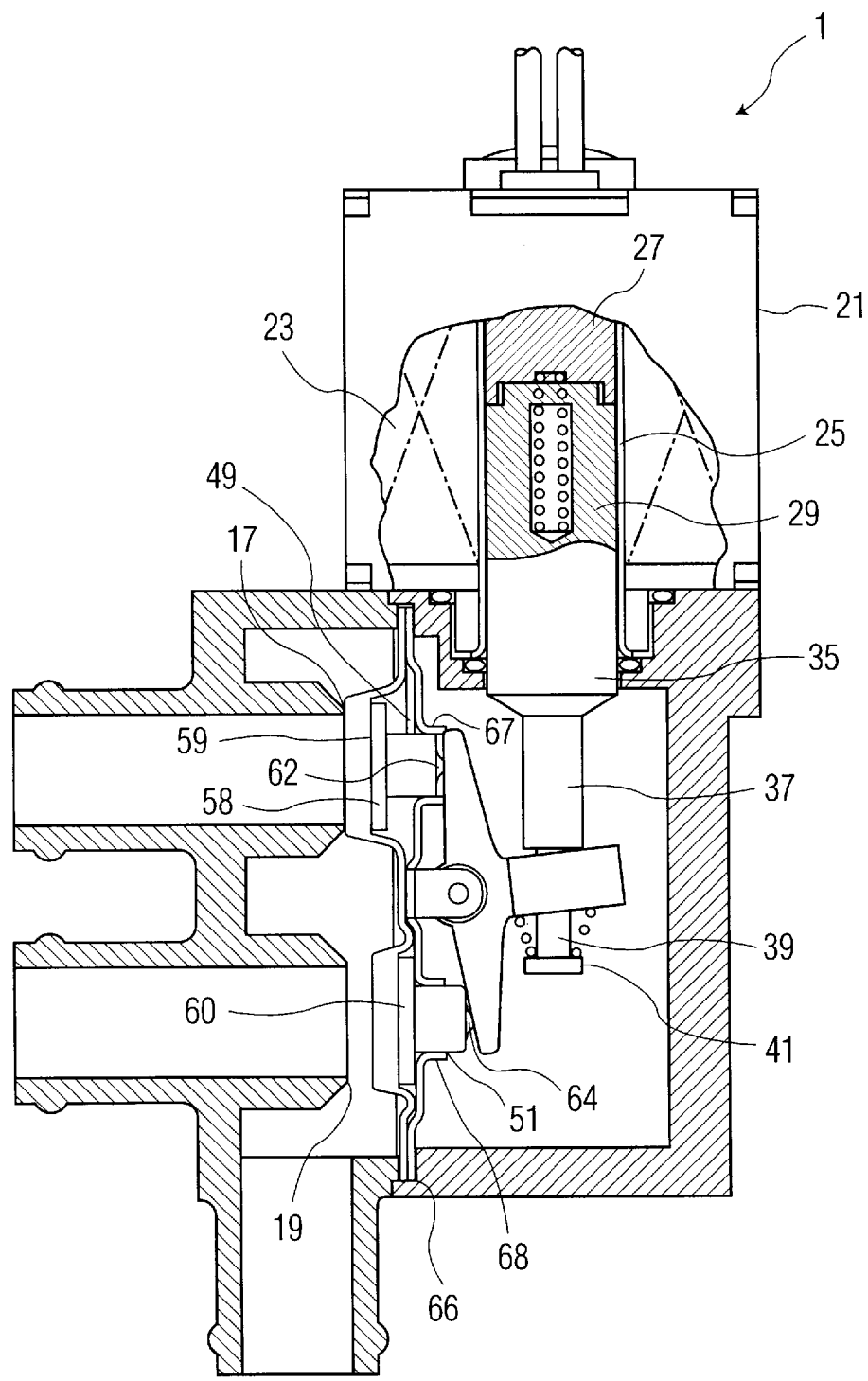
FIG. 2 is an elevation view of the rocker valve of FIG. 1, with certain parts shown in section, the rocker valve being in a second state.

Referring now to FIGS. 1 and 2 of the drawings, there is shown a rocker valve 1 having a housing 3 with an interior which is divided by an apertured support plate 5 into a fluid chamber 7 into which an inlet port 9 and two outlet ports 11 and 13 lead, and an operating chamber 15 in which the operating mechanism of the rocker valve 1 is disposed. Fluid enters into the fluid chamber 7 through inlet port 9 for distribution through one or the other of two outlet ports 11 and 13.

Each of the outlet ports 11 and 13 has an integral valve seat 17, 19 on an end proximate the operating chamber 15. The valve seats 17 and 19 are in a plane transverse to the axes of the outlet ports 11 and 13 and valve seats 17 and 19. The valve seats may have openings which are large relative to the span of the rocker arm, i.e., the diameters of the valve seats may be equal to ten percent (10%) or more of the distance between their axes under which conditions conventional rocker valves do not provide an even seal. Of course the rocker valve of the present invention can also be used to seal openings of diameter less than ten percent of the distance between the openings.

Mounted above the operating chamber 15 is a solenoid 21 with a winding 23 surrounding a core tube 25 within one end of which there is fixedly mounting a plug nut or pole piece 27. Beneath the plug nut 27, a plunger 29 extending into the operating chamber 15 is slidably mounted for reciprocating motion within the hollow bore 31 of the core tube 25. The plunger 29 has a blind cylindrical bore 33 in which there is disposed a compressed coil spring 34 to normally urge the plunger 29 downwardly in the views of FIGS. 1 and 2.

The plunger 29 has a stepped diameter which decreases toward the bottom thereof to define three axially displaced segments 35, 37, and 39. The maximum diameter segment 35 is principally snugly disposed within the bore of the core tube 25 and has one end engageable with the plug nut 27 when the solenoid 21 is energized (see FIG. 2). Extending axially from the maximum diameter plunger segment 35 is a segment 37 of intermediate diameter. Extending axially from the intermediate diameter plunger segment 37 is a segment 39 of minimum diameter. Mounted on the lowermost end of the plunger segment 39 of minimum diameter is a flange 41 forming a shoulder.

A T-shaped rocker 43 pivotally mounted between two parallel posts 48 extending horizontally from the support plate 5 has a control arm 42 and two transverse pressure arms 44 and 46 extending from the rocker's axis of rotation. The control arm 42 has an opening in which the plunger segment 39 is received. A compressed coil spring 47 mounted on the plunger segment 39 between the flange 41 and rocker control arm 42 on urges the control arm 42 against the shoulder 41 on the plunger 29.

Two respective cylindrical openings 49 and 51 are formed in the support plate 5 in which two respective pistons 53 and 55 are slidably mounted for reciprocation along axes in alignment with respective central axes of the outlet ports 11 and 13. Each of the pistons 53 and 55 has at one end proximate the fluid chamber 7, a valve sealing member 58, 60 slightly larger in diameter than the valve seat 17, 19 with which the respective piston is in axial alignment, and at an opposite end distal from the fluid chamber 7, a rounded bearing surface 62, 64 for engagement with a respective pressure arm 44, 46 of the valve rocker 43.

The pistons 53 and 55 are urged against respective pressure arms 44 and 46 of the valve rocker 43 by an elastomeric diaphragm 57 which bears on sealing surfaces 59 and 61 of the piston sealing members 58 and 60. The circumferences of the apertured support plate 5 and diaphragm 57 are entrapped within a groove 66 in the rocker valve housing 3. The diaphragm 57 is secured between a mask 65 having openings in alignment with the outlet ports 11 and 13 and the support plate 5. The operating chamber 15 in which the pistons 53 and 55 and valve rocker 43 are mounted is hermetically isolated from the fluid chamber 7 by the diaphragm 57.

As the rocker 43 is pivoted by reciprocation of the solenoid plunger 29, one of the pistons 53 and 55 urges the diaphragm 57 against its corresponding valve seat 17, 19 while the other piston is urged away from its corresponding valve seat.

In the first of two stable states which is shown in FIG. 1, the solenoid 21 is deenergized so that the coil spring 34 urges the plunger 29 downwardly to rotate the rocker 43 clockwise thereby moving the piston 55 toward the valve seat 19 for urging the diaphragm 57 against the valve seat 19 and sealing the outlet port 13. At the same time, the pressure arm 44 of the rocker 43 is rotated away from the outlet port 11 whereby pressure from the expanded diaphragm 57 urges the piston 53 towards rocker pressure arm 44 and away from valve seat 17.

In FIG. 1, fluid which, under pressure, has entered the fluid chamber 7 from inlet port 9 is prevented from exiting through outlet port 13 while it is free to exit from the fluid chamber 7 through outlet port 11. The sealing surface 61 of the sealing member 60 on the piston 55 is maintained parallel to the valve seat 19 on the outlet port 13 at virtually all times during the travel of the piston 55 from its open position distal from the valve seat 19 to its sealing position at which it urges the diaphragm 57 into engagement with valve seat 19, due to the close fit between the outer circumference of the piston 55 and the surrounding cylindrical wall 68 which prevents skewing of the piston 55 irrespective of the angle of rotation of the rocker 43.

When voltage is applied to leads connected to the coil 23 of the solenoid 21, the plug nut 27 is magnetized sufficiently to attract the plunger 29 with a pull greater than the combined downward forces of the compression spring 34 and weight of the plunger 29 so that the plunger 29 moves upwardly until it engages the plug nut 27. At this second of two stable positions of the rocker valve 1, the valve is in the disposition shown in FIG. 2, with the rocker 43 is rotated fully counterclockwise.

In FIG. 2, fluid which, under pressure, has entered the fluid chamber 7 from the inlet port 9 is prevented from exiting through the outlet port 11 while it is free to exit from the fluid chamber 7 through the outlet port 13. The sealing surface of the sealing member on the piston 53 is maintained parallel to the valve seat on the outlet port 11 at virtually all times during the travel of piston 53 from its open position distal from valve seat 17 to its sealing position at which it urges the diaphragm 57 into engagement with valve seat 17. Skewing of the pistons 53 and 55 and corresponding sealing surfaces 59 and 61 is prevented by the close fit between the outer circumference of each piston 53, 55 and its respective surrounding cylindrical wall 67, 68.

It is to be appreciated that the foregoing is a description of a preferred embodiment of the invention to which variations and modifications may be made without departing from the spirit and scope of the invention. For example, the ends of the pistons 53 and 55 which are shown to have bearing surfaces may be pivotally attached to the pressure arms 44 and 46 of the rocker 43 so that they are drawn away from the respective outlet ports 11 and 13 by the movement of the rocker 43 irrespective of the force exerted by the diaphragm 57. Moreover, the rocker 43, pistons 53 and 55 and diaphragm 57 can be used to seal more than two outlet ports 11 and 13 by having additional pistons engaged with the rocker arm. Sealing of the ports needn't be limited to the outlet ports 11 and 13. That is, two or more inlet ports may be selectively opened and closed to enable fluid from two or more different sources to alternately enter one or more outlet ports in a valve according to the invention.

What is claimed is:

1. A valve for controlling the flow of fluid comprising
    a housing having a chamber with a first port bounded by a first valve seat and a second port bounded by a second valve seat,
    rocker means pivotally mounted in said housing and having first and second pressure arms, said rocker means being rotatable between a first position for sealing said first port while permitting fluid flow between said second port and said third port, and a second position for sealing said second port while permitting fluid flow between said first port and said third port,
    first sealing means responsive to pressure exerted by said first pressure arm for preventing fluid flow through said first port when said rocker means is in said first position and for permitting fluid flow through said first port when said rocker means is in said second position, first piston means slidably mounted in said housing for straight line motion therein and being engageable with said first pressure arm and said first sealing means for urging said first sealing means to prevent fluid flow through said first port in response to rotation of said rocker means to said first position, second sealing means responsive to pressure exerted by said second pressure arm for preventing fluid flow through said second port when said rocker means is in said second position and for permitting fluid flow through said second port when said rocker means is in said first position, and second piston means slidably mounted in said housing for straight line motion therein and being engageable with said second pressure arm and said second sealing means for urging said second sealing means to prevent fluid flow through said second port in response to rotation of said rocker means toward said second position, a flexible diaphragm means mounted in said housing and dividing said housing chamber into a fluid chamber and an operating chamber, said first and second valve seats being in said fluid chamber, and said first and second sealing means being in said operating chamber and engageable with said diaphragm means for urging said diaphragm means into engagement with said first valve seat when said rocker means is in said first position and for urging said diaphragm means into engagement with said second valve seat when said rocker means is in said second position.

2. A valve according to claim 1 further comprising solenoid means having a plunger movable between an energized position and a deenergized position, said rocker means having a control arm operatively connected to said plunger means for being rotated to said first position when said plunger means is moved to one of said energized and deenergized positions and for being rotated to said second position when said plunger means is moved to the other of said energized and deenergized positions.

3. A valve according to claim 1 wherein said first sealing means is in a plane parallel to the plane of said first valve seat and transverse to the direction of translation of said first piston when said first sealing means is disengaged from said first valve seat and said second sealing means is in a plane parallel to the plane of said second valve seat and transverse to the direction of translation of said second piston when said second sealing means is disengaged from said second valve seat.

* * * * *